(12) United States Patent
Lind et al.

(10) Patent No.: US 9,884,444 B2
(45) Date of Patent: Feb. 6, 2018

(54) ENHANCED ADDITIVE MANUFACTURING WITH A RECIPROCATING PLATEN

(71) Applicant: UT-Battelle, LLC, Oak Ridge, TN (US)

(72) Inventors: Randall F. Lind, Loudon, TN (US);
Craig A. Blue, Knoxville, TN (US);
Lonnie J. Love, Knoxville, TN (US);
Brian K. Post, Knoxville, TN (US);
Peter D. Lloyd, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 454 days.

(21) Appl. No.: 14/517,571

(22) Filed: Oct. 17, 2014

(65) Prior Publication Data

US 2016/0107389 A1     Apr. 21, 2016

(51) Int. Cl.
| | | |
|---|---|---|
| B29C 47/12 | (2006.01) |
| B29C 64/209 | (2017.01) |
| B29C 64/106 | (2017.01) |
| B29C 64/20 | (2017.01) |
| B29C 64/386 | (2017.01) |
| B29C 47/06 | (2006.01) |
| B33Y 10/00 | (2015.01) |
| B33Y 30/00 | (2015.01) |
| B33Y 50/02 | (2015.01) |
| B29K 101/12 | (2006.01) |

(52) U.S. Cl.
CPC .......... *B29C 47/122* (2013.01); *B29C 64/106* (2017.08); *B29C 64/20* (2017.08); *B29C 64/209* (2017.08); *B29C 64/386* (2017.08); *B29K 2101/12* (2013.01); *B33Y 10/00* (2014.12); *B33Y 30/00* (2014.12); *B33Y 50/02* (2014.12)

(58) Field of Classification Search
CPC .................................................... B29C 47/122
USPC .................................................. 425/167, 375
See application file for complete search history.

(56) References Cited

U.S. PATENT DOCUMENTS

| | | | | |
|---|---|---|---|---|
| 2,784,453 A * | 3/1957 | Hjulian | ................... | B22F 3/172 100/906 |
| 5,645,785 A * | 7/1997 | Cornils | ............... | B29C 47/0019 156/108 |
| 6,210,049 B1 * | 4/2001 | Yamada | ................. | B41J 11/007 396/575 |
| RE37,341 E * | 8/2001 | Cornils | ................. | B05C 5/0204 156/108 |
| 6,450,416 B1 * | 9/2002 | Berg | ..................... | B05C 5/0225 239/102.1 |
| 6,622,934 B1 * | 9/2003 | Sanada | ................... | B05B 12/08 239/102.2 |
| 7,799,257 B2 * | 9/2010 | Jamia | .................... | B29B 13/023 264/252 |

(Continued)

*Primary Examiner* — Atul P. Khare
(74) *Attorney, Agent, or Firm* — Pauley Erickson & Kottis

(57) ABSTRACT

An additive manufacturing extrusion head that includes a heated nozzle for accepting a feedstock and extruding the feedstock onto a substrate at a deposition plane, the nozzle having a longitudinal extrusion axis. A reciprocating platen surrounds the nozzle, the platen operable to reciprocate along the extrusion axis at or above the deposition plane as the nozzle extrudes feedstock onto the substrate; and wherein the platen flattens the extruded feedstock such that it does not protrude above the deposition plane as the extrusion head traverses over the substrate.

12 Claims, 2 Drawing Sheets

(56) References Cited

U.S. PATENT DOCUMENTS

| | | | | |
|---|---|---|---|---|
| 2015/0183159 A1* | 7/2015 | Duty | ............... | B29C 67/0055 |
| | | | | 428/195.1 |
| 2015/0183164 A1* | 7/2015 | Duty | ............... | B29C 67/0085 |
| | | | | 425/3 |
| 2015/0291833 A1* | 10/2015 | Kunc | ............... | B29C 67/0055 |
| | | | | 428/413 |
| 2016/0046073 A1* | 2/2016 | Hadas | ............... | B29C 67/0085 |
| | | | | 264/211.21 |

* cited by examiner

ENHANCED ADDITIVE MANUFACTURING WITH A RECIPROCATING PLATEN

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to enhanced additive manufacturing using a reciprocating platen in association with a deposition nozzle.

BACKGROUND OF THE INVENTION

Advanced manufacturing, also referred to herein as additive manufacturing, may be used to quickly and efficiently manufacture complex three-dimensional components layer-by-layer, effectively forming the complex component. Such advanced manufacturing may be accomplished using polymers, alloys, powders, solid wire or similar feed stock materials that transition from a liquid or granular state to a cured, solid component.

Polymer-based advanced manufacturing is presently accomplished by several technologies that rely on feeding polymer materials through a nozzle that is precisely located over a substrate. Parts are manufactured by the deposition of new layers of materials above the previously deposited layers. Unlike rapid prototyping processes, advanced manufacturing is intended to produce a functional component constructed with materials that have strength and properties relevant to engineering applications. On the contrary, rapid prototyping processes typically produce exemplary models that are not production ready.

In general, advanced manufacturing selectively adds material in a layered format enabling the efficient fabrication of incredibly complex components. Unlike subtractive techniques that require additional time and energy to remove unwanted material, advanced manufacturing deposits material only where it is needed making very efficient use of both energy and raw materials. This can lead to significant time, energy, and cost savings in the manufacture of highly advanced components for the automotive, biomedical, aerospace and robotic industries. In fact, advanced manufacturing is a manufacturing technique in which it may be faster, cheaper, and more energy efficient to make more complex parts. However, wide scale adoption of this technology requires a non-incremental improvement in production rates and component scale.

Conventional polymer extrusion systems typically feed a polymer filament into a liquefier to extrude a material. Existing materials experience expansion upon melting and contraction upon cooling due to their coefficient of thermal expansion (CTE). If a part is manufactured by depositing hot material over cool material, the constrained cooling manifests itself as residual stress which manifests itself as curl and warp. In addition, one specific challenge is that when extruded material is deposited with a nozzle, the material often bulges above the nozzle face. Such bulges in the material, when solidified, interfere with the deposition of subsequent adjacent beads of material. In addition, it is difficult to fill material into a given layer without voids or overfilling.

The subject invention improves the deposition quality of additively manufactured parts by reducing unwanted bulges, voids and geometric errors during deposition. The subject invention is further designed for use within or outside of an oven. In addition, the subject invention may further act to improve layer-to-layer adhesion.

SUMMARY OF THE INVENTION

According to a preferred embodiment of this invention, bulges, voids and overfilling may be avoided or minimized through the use of a reciprocating platen. Specifically, the subject invention preferably includes an additive manufacturing extrusion head having a nozzle depositing feedstock along a deposition plane. A platen is preferably positioned at a tip of the nozzle wherein the platen reciprocates between a position above the deposition plane and a position at or below the deposition plane in a generally continuous manner during deposition of the extruded feedstock. In this manner, such bulges, voids and overfilling may be avoided or mitigated for improved part strength and surface finish quality.

According to additional embodiments of this invention, a load cell may be positioned with respect to the platen to provide feedback regarding a desired contacting force between the platen and the part or substrate.

Other objects and advantages will be apparent to those skilled in the art from the following detailed description taken in conjunction with the appended claims and drawings.

DETAILED DESCRIPTION OF THE INVENTION

The present invention provides a component manufactured using an advanced manufacturing process wherein a supply of working material or feedstock is provided to a deposition system. The feedstock is then preferably heated and deposited in a desired position through a nozzle during a build of the component. The build as described herein may occur within an oven, heated bed and/or outside of such a system and at atmospheric temperature.

Figure 1:
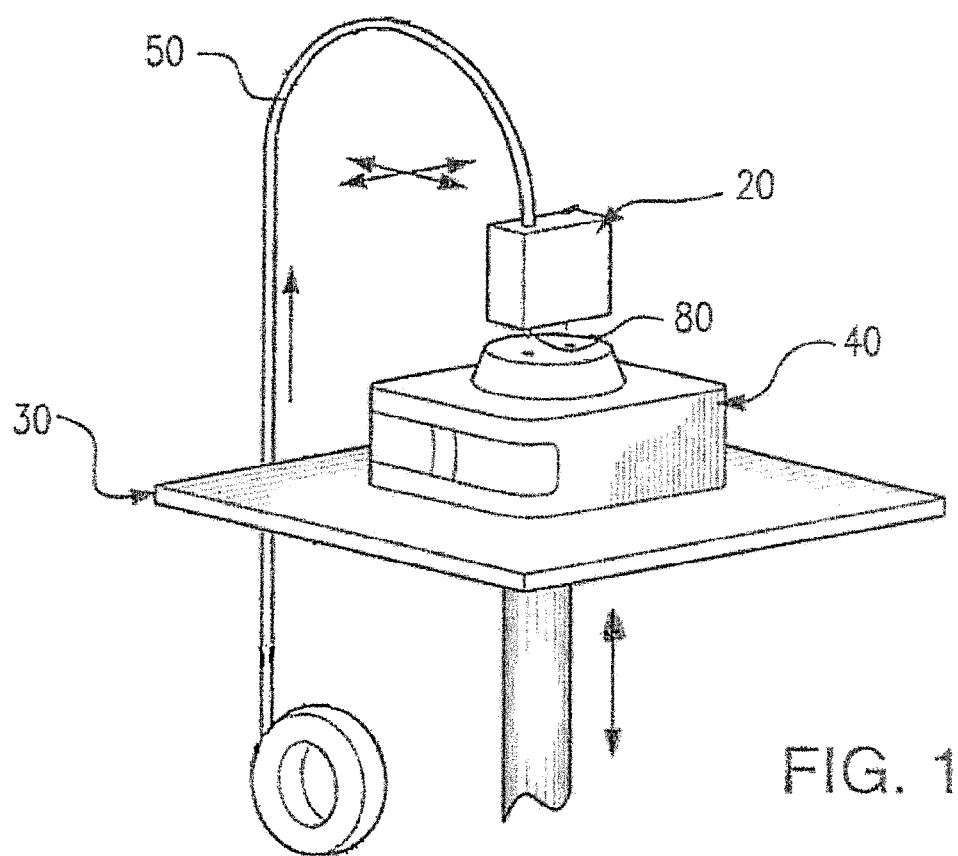
FIG. 1 is a schematic of a conventional polymer extrusion system that feeds a polymer filament into a liquefier to extrude a material.

Conventional polymer extrusion systems feed a polymer filament into a liquefier to extrude a material, such as shown in FIG. 1. As shown a conventional polymer extrusion system uses a moveable print head 20 positioned with respect to a work surface 30 to create a desired work piece, component, or part 40. As shown in FIG. 1, a filament 50 may be fed through the print head 20 using drive wheels or a similar mechanism to draw the filament 50 through a heating element within the nozzle 80 to liquefy and extrude the feed material through a nozzle 80 and onto the part 40. As the part is constructed, the work surface 30 and/or the print head 20 may be adjusted to accommodate the material added to the part 40.

Suitable polymers include, for instance, ABS, polycarbonate, PLA, Ultem, Nylon, or PPSF/PPSU. In some instances, chopped or continuous reinforcing fibers may be added to the polymers for increased strength and improved stability of the part. The control of the motion of the extruder and/or the output of the extruder controls the development of a part. Different materials provide different mechanical properties. For example, ABS is a low cost durable material. Ultem is a very strong, stiff high temperature material ideal for tooling. Polycarbonate is a durable material that can be used for functional parts. PPSF/PPSU is a sterilizable, strong high-performance plastic ideal for biomedical applications.

As described above, when extruded material 50 is deposited from a print head 20 with a nozzle 80, the deposited material often bulges above a face of the nozzle 80. Such bulges in the material, when solidified, interfere with the deposition of subsequent adjacent beads of material. In addition, it is difficult to fill material into a given layer without voids or overfilling. The subject invention results in a generally smooth and consistent surface, having little or no voids, upon which to deposit subsequent layers or beads of material.

Figure 2:
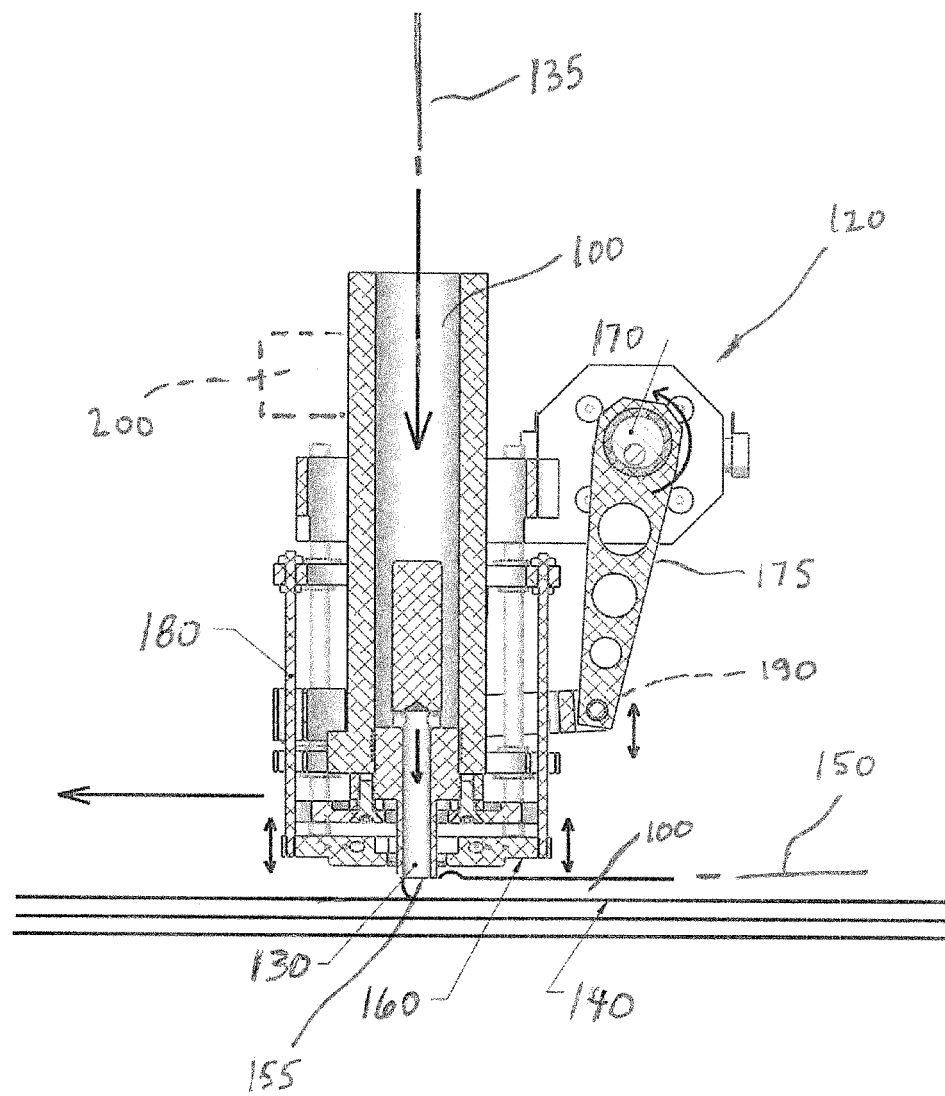
FIG. 2 is a partial sectional schematic of an additive manufacturing extrusion head according to one embodiment of this invention.

FIG. 2 shows a preferred embodiment of an additive manufacturing extrusion head 120 that accepts feedstock 100 and includes a nozzle 130 having a longitudinal extrusion axis 135. The feedstock 100 may be a filament 50, such as described above, pelletized material or similar material supply that is capable of a generally continuous feed from a supply to the extrusion head 120. The extrusion head 120 then extrudes the feedstock 100, preferably through a heated portion of the nozzle 130, onto a substrate 140 at a deposition plane 150. The substrate 140 may include a work surface 30, such as described above, or at least a portion of the part 40 in process.

As described above, the deposition plane 150 preferably resides in a generally common plane with a face 155 of the nozzle 130. As such, the feedstock 100 is deposited generally coplanar with the face 155 of the nozzle 130. One result of this arrangement is that bulges develop above the deposition plane 150 based on several factors including material temperature, ambient temperature, material composition, speed of deposition, and others.

As further shown in one preferred embodiment in FIG. 2, a platen 160 preferably surrounds the nozzle 130. In some examples, the platen partially surrounds the nozzle 130 and, in other examples, the platen fully surrounds the nozzle 130. The platen 160 preferably includes a surface area that is greater than a throat area of the nozzle 130. The platen 160 is preferably operable to reciprocate along the extrusion axis 135 at or above the deposition plane 150 as the nozzle 130 extrudes feedstock 100 onto the substrate 140. Specifically, the platen 160 is positioned generally around the face 155 of the nozzle 130 wherein the platen 160 reciprocates between a position above the deposition plane 150 and a position at or below the deposition plane 150. As a result of the position, configuration and reciprocating action of the platen 160, the platen 160 flattens the extruded feedstock such that it does not protrude above the deposition plane 150 and reduces voids as the extrusion head 120 traverses over the substrate 140.

As shown in FIG. 2, one specific embodiment of the subject invention may include a drive motor 170 and an eccentric link 175 connected between the platen 160 and the drive motor 170. In this manner, a reciprocating motion, parallel to longitudinal axis 135, may be imparted to the platen 160 through the translation of the rotation of the motor through the eccentric link 175.

According to one embodiment, a support structure may be positioned between the platen 160 and the nozzle 130 wherein the support structure is rigid in a perpendicular direction to the deposition plane 150 and compliant in a parallel direction to the deposition plane 150. As shown in FIG. 2, the support structure may comprise a plurality of flexible rods 180 connecting the platen 160 with respect to the nozzle 130 wherein the flexible rods 180 are stiff in a direction of the extrusion axis 135 and compliant in a direction of the deposition plane 150. Using a support structure in this manner, the platen 160 ideally flattens the extruded feedstock such that it does not protrude above the deposition plane 150 and reduces voids as the extrusion head 120 traverses the deposition plane 150.

According to one embodiment, there is a correlation between frequency of reciprocation of the platen 160 and a flow rate of feedstock 100 through the nozzle 130. Suitably, the frequency of the platen 160 may be adjusted or adjustable depending on the desired deposition rate. As described above, the flexible rods 180 allow some deflection, for example, in one embodiment approximately ⅒ of an inch. As such, the depth and speed of reciprocation of the platen 160 may be adjusted to travel only ²⁄₁₀th of an inch in between cycles or 10 Hz with a tip speed of 2 in/s. Increasing the flow rate necessarily requires a higher platen reciprocation frequency to match the increased nozzle flow rate.

The stroke length of reciprocation of the platen 160 is less important but should be substantial enough to extend flush with at least the deposition plane 150. When extended, the platen 160 is preferably flush with the end of the nozzle 130 thereby assuring the bead of deposited material is compressed to a desired height. So long as the platen 160 disengages from the deposited material, the desired benefits are achieved, i.e. level layers, increased bond area, and more complete infill. If the platen 160 doesn't lift high enough during the up stroke, adhesion and bead swell can maintain contact, smearing the deposited material. A loose correlation exists between layer height and bead swell which can be additionally used to help determine necessary stroke length of the platen 160.

According to a further embodiment of this invention, the extrusion head 120 may further include a load cell 190 connected with respect to the platen 160. The load cell 190 in this embodiment preferably measures a contacting force between the platen 160 and the extruded feedstock. In addition, the contact force may be continually varied based upon feedback from the load cell 190. Further, a flow rate of the feedstock 100, rotational speed of motor 170 and/or a horizontal velocity of the nozzle 130 may be varied in response to the feedback to achieve a desired contact force.

The additive manufacturing extrusion head according to one embodiment may further include a cooling system 200 connected with respect to the platen 160. Internal channels distribute the coolant within the platen. In addition, or alternatively, a low friction coating (not shown) may be applied to the platen 160. A coating such as DuPont TEFLON brand coating or similar coating may be used in this application. Such modifications to the platen 160 preferably inhibit adherence between the platen 160 and the extruded feedstock, which in many cases may be a hot polymer.

In a method in accordance with this invention, the supply of feedstock 100 is provided to the heated nozzle 130 having a surrounding platen 160. The feedstock 100 is then extruded onto the substrate along the deposition plane 150. The platen 160 is reciprocated along the extrusion axis 135 at or above the deposition plane 150 as the nozzle 130 continues to extrude feedstock 100 onto the substrate 140. In this manner, the extruded feedstock is flattened with the platen 160 such that a flattened extruded feedstock does not protrude above the deposition plane 150 as the extrusion head traverses over the substrate 140.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. An additive manufacturing extrusion head comprising:
    a heated nozzle for accepting a feedstock and extruding the feedstock onto a substrate at a deposition plane, said nozzle having a longitudinal extrusion axis perpendicular to said deposition plane;
    a reciprocating platen surrounding said nozzle, said platen operable to reciprocate along the extrusion axis at or above the deposition plane as said nozzle extrudes said feedstock onto the substrate; and
    a support structure connecting the platen with respect to the nozzle the support structure being stiff in a direction of the extrusion axis and compliant in a direction of the deposition plane,
    wherein said platen flattens the extruded feedstock such that it does not protrude above the deposition plane as the extrusion head traverses over the substrate.

2. The additive manufacturing extrusion head of claim 1 further comprising:
    a load cell connected with respect to the reciprocating platen, the load cell measuring a contacting force between the platen and the extruded feedstock.

3. The additive manufacturing extrusion head of claim 1 further comprising:
    a drive motor; and
    an eccentric link connected between the platen and the drive motor, wherein the eccentric link includes a load cell.

4. The additive manufacturing extrusion head of claim 1 further comprising:
    a cooling system connected with respect to the platen.

5. The additive manufacturing extrusion head of claim 1 further comprising:
    a low friction coating applied to the platen.

6. The additive manufacturing extrusion head of claim 1 wherein the support structure comprises a plurality of flexible rods connecting the platen with respect to the nozzle, and wherein the flexible rods are stiff in a direction of the extrusion axis and compliant in a direction of the deposition plane.

7. An additive manufacturing extrusion head comprising:
    a heated nozzle depositing feedstock onto a substrate along a deposition plane;
    a platen positioned at a tip of the nozzle, wherein the platen reciprocates along a direction perpendicular to the deposition plane between a position above the deposition plane and a position at or below the deposition plane to flatten the deposited feedstock as the extrusion head traverses over the substrate;
    a support structure connecting the platen with the nozzle the support structure being rigid in a direction perpendicular to the deposition plane and compliant in a direction parallel to the deposition plane; and
    a load cell positioned with respect to the platen, the load cell measuring a contacting force between the platen and the deposited feedstock.

8. The additive manufacturing extrusion head of claim 7 wherein the platen flattens the deposited feedstock such that it does not protrude above the deposition plane as the extrusion head traverses the deposition plane.

9. The additive manufacturing extrusion head of claim 7 wherein the support structure comprises a plurality of flexible rods.

10. The additive manufacturing extrusion head of claim 7 further comprising:
    a cooling system connected with respect to the platen.

11. The additive manufacturing extrusion head of claim 7 wherein the platen includes a surface area that is greater than a throat area of the nozzle.

12. The additive manufacturing extrusion head of claim 7 wherein the platen is connected with respect to an eccentric gear for imparting the reciprocating motion.

* * * * *